Figure 1:
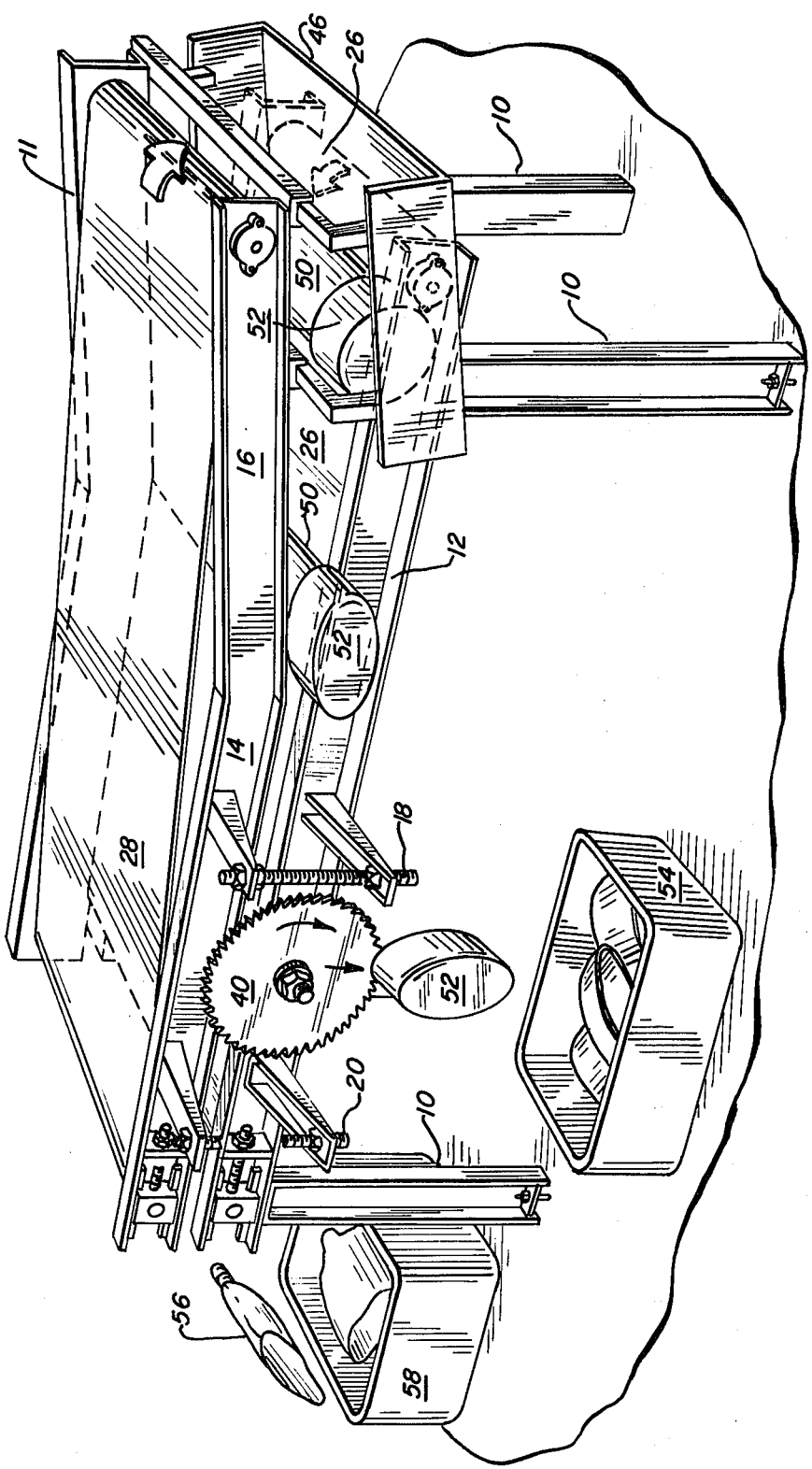

United States Patent [19]

Burns, Jr.

[11] 4,418,594

[45] Dec. 6, 1983

[54] BOTTLE SAW SYSTEM
[75] Inventor: Charles W. Burns, Jr., Orlando, Fla.
[73] Assignee: Standard Oil Company (Indiana), Chicago, Ill.
[21] Appl. No.: 320,867
[22] Filed: Nov. 13, 1981
[51] Int. Cl.³ .............................................. B26D 7/08
[52] U.S. Cl. ....................................... 83/19; 83/435.2; 83/176; 100/902
[58] Field of Search ................... 83/19, 17, 176, 435.2; 100/152, 153, 902, 39, 98 R

[56] References Cited
U.S. PATENT DOCUMENTS 1,291,811 1/1919 Ellis ................................ 83/435.2 X
1,561,479 11/1925 Oettel ............................. 83/435.2 X
1,609,523 12/1926 McLaughlin ....................... 100/98 R
3,077,827 2/1963 Bunke et al. ...................... 100/902 X
3,734,007 5/1973 Husen ................................. 100/152
3,757,625 9/1973 Pfenning et al. .................... 83/435.2
4,163,406 8/1979 Crawford ............................ 83/435.2

Primary Examiner—Donald R. Schran
Attorney, Agent, or Firm—Robert R. Cochran; William T. McClain; William H. Magidson

[57] ABSTRACT

A reclaim system for plastic bottles whereby the bottles are held between moving belts and the contaminated portion sawed from the uncontaminated portion, thereby permitting suitable reclaim of the respective parts. The method of operation is also shown.

6 Claims, 2 Drawing Figures

BOTTLE SAW SYSTEM

This invention relates to a bottle saw system adapted to cut plastic bottles prior to reusing uncontaminated resin and scraping contaminated resin. In the production of plastic bottles, some unsatisfactory bottles are made, which cannot be used. In the plastic bottle, as it has found greatest utility, bottles are blown from a preform, a base cup is adhesively applied, and a label is adhesively applied to the central body portion of the bottle. A bottle may be discarded at any stage in the production system. However, where a base cup and/or label has been applied, the adhesive used in applying the base cup and the label along with the base cup and the label, per se, prohibit use of the resin for the production of new bottles. My system provides a method of cutting base cups from unlabeled bottles or cutting the uncontaminated upper portion of the bottle from the portion containing the base cup and label before both of these items have been applied.

In prior handling of these discarded bottles, hand cutting systems have been used, but this constitutes a hazardous operation, insofar as the operator is concerned. Desired would be a system for handling the bottles for the cutting operation where the operator is located a considerable distance from the cutting means and which further provides control for positioning the bottle and moving it past the cutting means while it is held in a stable position with respect to the cutting-means.

An object of this invention is to provide apparatus for cutting plastic bottles to permit reclaim of reusable uncontaminated resin. A further object of this invention is to provide apparatus which is rapid and safe for carrying out this cutting operation. Other objects will be apparent to those skilled in the art upon reading this disclosure.

The only apparatus for cutting bottles of which I am aware is that shown in Pelot U.S. Pat. No. 3,429,211 (1969), wherein apparatus for deflashing bottles is shown. In the Pelot system, bottles are moved past a steel fixed cutting blade, which trims the flash from the neck of the bottle.

Most of the carbonated beverage bottles in commercial production today are made of polyethylene terephthalate resins, although other polyalkylene terephthalates, such as polybutylene terephthalate resins have been used. However, this system is also applicable to bottles made from other resins, such as polyethylene, polypropylene, ABS, PVC, etc.

Broadly, my invention resides in apparatus for cutting plastic bottles comprising a lower and upper support system having inlet and outlet ends, said support system comprising a first generally horizontal support table, an upper support table having a first portion substantially parallel to said support table extending from the outlet end to an intermediate portion of said system spaced less than a bottle diameter above said first support table and a second portion extending from said intermediate portion to said inlet end and upwardly away from said lower support table thereby providing a gradually decreasing distance from the inlet end to said intermediate portion, belts mounted on said upper and lower support tables, drive means adapted to drive said belts, means for adjusting the distance between said upper and lower support tables, a saw mounted on said lower support table at a position between said intermediate portion on the outlet end of said system, and an adjustable chute mounted on said upper support table at the inlet end of said system.

In another aspect, my invention resides in a method of cutting a plastic bottle into upper and lower portions measured axially of the bottle, which comprises guiding the bottle into a compression zone, compressing the bottle, passing the bottle past a saw, and separately recovering upper and lower portions of the bottle.

Figure 2:
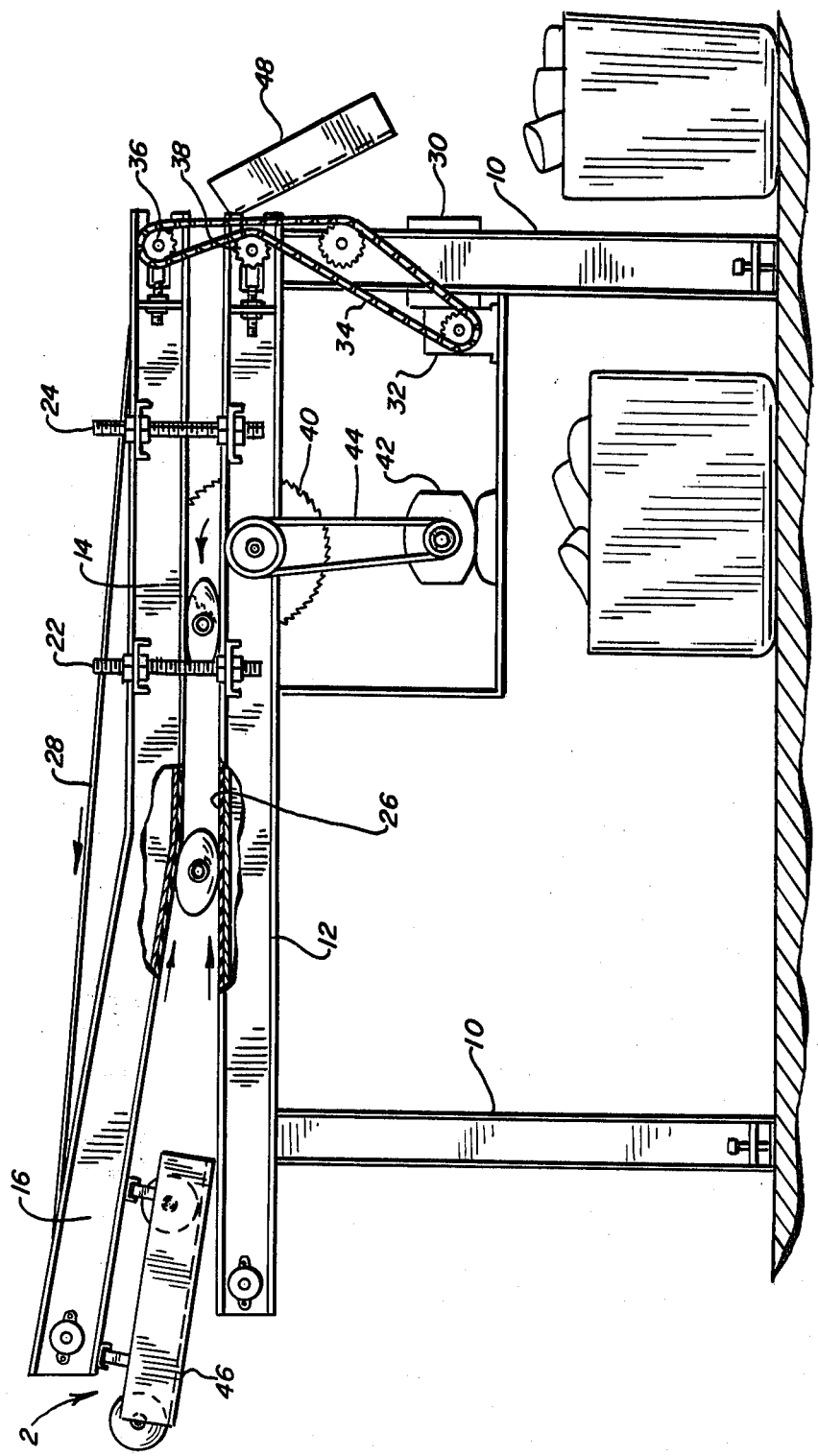

Accompanying and forming a part of this application is a drawing comprising:

FIG. 1, a perspective view of one side of the apparatus arbitrarily designated the front thereof, and;

FIG. 2, a plan view, partly in section, arbitrarily designated as the back of the apparatus.

Since these two views of the apparatus show many of the same features, the following description is made referring to both of the Figures:

Supported on legs 10 is a generally horizontal support table 12, positioned above horizontal support table 12 is an upper support table 11 having a first portion 14 substantially parallel to said support table 12 and a second portion 16 extending at an angle upwardly from an intermediate portion of the horizontal support table 12 to provide an inlet zone between support table 12 and support table 16 as will be hereinafter apparent. This intermediate portion can be at approximately the middle, measured from end to end, of support table 12 but considerable variation can be made, the only essential requirement that it be upstream of the saw to be described hereinafter. The distance between support tables 12 and 14 is adjustable by set screws 18 and 20 on the front of the table and 22 and 24 on the back of the table. Adjustments of the nuts on the screws establishes the distance between the tables and the distance should be sufficient to properly grip a bottle passing therebetween. Normally, a distance of one to one and one-half inches is satisfactory for this distance but the proper distance for a particular system can be readily established by trial and error. Belt 26 is mounted on lower support table 12 and belt 28 is mounted on upper support table portions 14 and 16. These belts pass freely over shafts (not shown) on the inlet end of the system and over driven shafts (not shown) at the outlet end of the system in the direction indicated by arrows thereon. The belts are driven by motor 30 through gear box 32 and chain drive 34 driving gears 36 and 38, this system being shown in FIG. 2. Adjustment blocks are provided to provide proper tension on the belts. Mounted beside support table 12 and portion 14 of the upper support table is a rotating saw 40. I have found that a carbide tipped blade will function over long periods in cutting polyethylene terephthalate bottles. Motor 42 drives saw 40 by means of belt 44.

At the inlet end of the system, an adjustable chute 46 is provided, this chute being adjusted transversely with respect to the movable belts in the system.

A chute 48 is provided at the discharge end of the apparatus.

In operation, bottles 50 are dropped into the chute in order then to be positioned so that the saw cuts the desired portion of the bottle. In FIG. 1, the bottles are shown with base cups 52 glued to the main body portion 50 of the bottle. The bottles are squeezed between the moving belts and forced past the saw 40 to separate the base cup portion of the bottle, which, in FIG. 1, is shown dropping into a container 54. The reclaimable portion of the bottle 56 is shown dropping into container 58.

A vacuum system can be provided if dust created by the saw becomes a problem, but for ease in understanding the basic invention, this has not been shown.

Obviously, modifications of the basic structure shown will be apparent to those skilled in the art upon reading this disclosure, the specific apparatus being illustrated as the preferred embodiment.

I claim:

1. Apparatus for cutting plastic bottles comprising a lower and upper support system having inlet and outlet ends, said support system comprising a first generally horizontal support table, an upper support table having a first portion substantially parallel to said support table extending from the outlet end to an intermediate portion of said system spaced less than a bottle diameter above said first support table and a second portion extending from said intermediate portion to said inlet end and upwardly away from said lower support table thereby providing a gradually decreasing distance from the inlet end to said intermediate portion, belts mounted on said upper and lower support tables, drive means adapted to drive said belts, means for adjusting the distance between said upper and lower support tables, a saw mounted on said lower support table at a position between said intermediate portion on the outlet end of said system, and an adjustable chute mounted on said upper support table at the inlet end of said system.

2. The apparatus of claim 1 where the angle between the lower support table and the portion of the upper support table extending from the intermediate portion to the inlet end is 5 to 20 degrees.

3. The apparatus of claim 1 wherein the distance between the lower support table and the first portion of the upper support table is one to one and one-half inches.

4. The apparatus of claim 1 wherein the adjustable chute is movable transversely across the inlet end of the system.

5. The apparatus of claim 1 wherein the saw has a carbide tipped blade.

6. A method of cutting a plastic bottle into upper and lower portions measured axially of the bottle which comprises guiding the bottle into a compression zone, compressing the bottle, passing the bottle past a saw, and separately recovering upper and lower portions of the bottle.

* * * * *

UNITED STATES PATENT OFFICE
CERTIFICATE OF CORRECTION

Patent No. 4,418,594   Dated December 6, 1983

Inventor(s) Charles W. Burns, Jr.

It is certified that error appears in the above-identified patent and that said Letters Patent are hereby corrected as shown below:

| Col. | Line | |
|---|---|---|
| 1 | 6 | Patent reads "scraping" and should read --scrapping-- |
| 1 | 20 | Patent reads "containing the base cup and label before" and should read --containing the base cup and label after-- |
| Col. 4 | 2 | "on" should read -- and -- |

Signed and Sealed this

Ninth Day of October 1984

[SEAL]

Attest:

GERALD J. MOSSINGHOFF

Attesting Officer   Commissioner of Patents and Trademarks